United States Patent
Narendran

Patent Number: 5,760,391
Date of Patent: Jun. 2, 1998

[54] PASSIVE OPTICAL WAVELENGTH ANALYZER WITH A PASSIVE NONUNIFORM OPTICAL GRATING

[75] Inventor: Nadarajah Narendran, Clifton Park, N.Y.

[73] Assignee: Mechanical Technology, Inc., Latham, N.Y.

[21] Appl. No.: 683,751

[22] Filed: Jul. 17, 1996

[51] Int. Cl.$^6$ .................................................. H01J 5/16
[52] U.S. Cl. .......................... 250/227.14; 250/227.18; 356/32; 385/37
[58] Field of Search .............. 250/227.11, 227.23, 250/227.21, 227.14, 227.18, 237 G; 385/37, 13; 356/32, 324, 328, 330, 305, 334

[56] References Cited

U.S. PATENT DOCUMENTS

| | | | |
|---|---|---|---|
| 4,517,456 | 5/1985 | Halsall et al. | 250/226 |
| 4,740,688 | 4/1988 | Edwards | 250/227.23 |
| 4,745,293 | 5/1988 | Christensen | 250/577 |
| 4,761,073 | 8/1988 | Meltz et al. | 356/32 |
| 4,874,941 | 10/1989 | Spillman, Jr. | 250/237 G |
| 4,985,624 | 1/1991 | Spillman, Jr. | 250/237 G |
| 5,012,090 | 4/1991 | Spillman, Jr. | 250/227.21 |
| 5,182,779 | 1/1993 | D'Agostino et al. | 385/13 |
| 5,281,811 | 1/1994 | Lewis | 250/226 |
| 5,283,430 | 2/1994 | Carlin et al. | 250/227.23 |
| 5,283,686 | 2/1994 | Huber | 359/337 |
| 5,319,435 | 6/1994 | Melle et al. | 356/32 |
| 5,351,324 | 9/1994 | Forman | 385/37 |
| 5,365,334 | 11/1994 | Bottka | 356/326 |
| 5,387,792 | 2/1995 | Carlin et al. | 250/227.23 |
| 5,410,404 | 4/1995 | Kersey et al. | 356/345 |
| 5,442,169 | 8/1995 | Kunz | 250/227.21 |

OTHER PUBLICATIONS

Publication in Chemical, Biochemical, and Environmental Fiber Sensors III (1991) titled "Totally Integrated Optical Measuring Sensors", Author: R.E. Kunz, Paul Scherrer Institute Zurich, Badenerstrasse 569, CH-8048 Zurich, Switzerland, Jan. 1991, pp. 98–113.

Publication in Chemical, Biochemical, and Environmental Fiber Sensors III (1991) titled "Fiber Bragg Grating Chemical Sensor", Authors: G. Meltz, W.W. Morey and J.R. Dunphy, United Technologies Research Center, Silver Lane, East Hartford, CT 06108, Jan. 1991, pp. 350–361.

(List continued on next page.)

*Primary Examiner*—Que Le
*Attorney, Agent, or Firm*—Heslin & Rothenberg, P.C.; Wayne F. Reinke, Esq.

[57] ABSTRACT

An optical sensor grating in a fiber-optic experiences a measurable parameter, such as strain, pressure and/or temperature. A passive nonuniform optical grating receives a light signal reflected by the optical sensor grating and spread out by a lens. A photodiode array behind the passive nonuniform optical grating senses a light intensity distribution of the reflected light signal. A microprocessor employs a simple peak detection algorithm to detect a maximum or minimum intensity of the reflected light signal at the photodiode array, and correlates the location of the maximum or minimum intensity to the measurable parameter experienced by the optical sensor grating.

21 Claims, 5 Drawing Sheets

OTHER PUBLICATIONS

Publication in IEEE Photonics Technology Letters, vol. 6, No. 12, Dec. 1994, titled "A Four–Element Fiber Grating Sensor Array with Phase–Sensitive Detection", Authors: R.S. Weis, A.D. Kersey & T.A. Berkoff, pp. 1469–1472.

Publication in IEEE Photonics Technology Letters, vol. 5, No. 9, Sep. 1993, titled "A Multiplexed Bragg Grating Fiber Laser Sensor System", Authors: Alavie et al., pp. 1112–1114.

Publication in Optics Communications, Sep. 15, 1994, titled "Demultiplexing of fibre Bragg grating temperature and strain sensors", Authors: Brady et al., pp. 51–54.

Publication in SPIE vol. 1798 Fiber Optic Smart Structures and Skins V (1992), titled "Two–Channel Fiber Bragg–Grating Strain Sensor with High Resolution Interferometric Wavelength Shift Detection",Authors: Kersey et al., Code 6574, Optical Sciences Division, Naval Research Laboratory, Washington, D.C. 20375, Jan. 1992, pp. 48–55.

Publication in 10th Optical Fibre Sensors Conference, Jan. 1994, titled "Bragg grating temperature and strain sensors", Authors: Brady et al., pp. 510–513.

Publication in Electronic Letters, Aug. 19, 1993, vol. 29, No. 17, titled "Novel Interrogating System for Fibre Bragg Grating Sensors Using an Acousto–Optic Tunable Filter", Authors: Xu et al., pp. 1510–1511.

Publication in Optics Letters, vol. 18, No. 1, Jan. 1, 1993, titled "Fiber–optic Bragg grating strain sensor with drift–compensated high–resolution interferometric wavelength–shift detection", Authors: Kersey et al., pp. 72–74.

Publication in Electronics Letters, 2 nd Mar. 1995, vol. 31, No. 5, titled "Referencing technique for intensity–based sensors using fibre optic/Bragg gratings", Authors: Cavaleiro et al., pp. 392–394.

Publication in Optics Letters, vol. 20, No. 11, Jun. 1, 1995, titled "Simultaneous interrogation of interferometric and Bragg grating sensors", Authors: Brady et al., pp. 1340–1342.

Publication in SPIE vol. 1798 Fiber Optic Smart Structures and Skins V (1992), entitled "Embedded Bragg grating fiber optic sensor for composite flexbeams", Authors: Bullock et al., Jan. 1992, pp. 253–261.

Publication in Optics & Photonics News, Jul. 1990, titled "Holographically generated gratings in optical fibers", Authors: Morey et al., pp. 14–16.

Publication in Fiber and Integrated Optics, vol. 10, pp. 351–360, titled "Multiplexing Fiber Bragg Grating Sensors", Authors: Morey et al., Nov. 1991.

Publication in Optics Letters, vol. 18, No. 16, Aug. 15, 1993 titled Multiplexing fiber Bragging grating strain–sensor system with a Fiber Fabry–Perot wavelength filter, Authors: Kersey et al., pp. 1370–1372.

Publication in Journal of Lightwave Technology, vol. 13, No. 7, Jul. 1995, titled Bragg Grating–Based Laser Sensors System with Interferometric Interrogation and Wavelength Division Multiplexing, Authors: Koo et al., pp. 1243–1249.

Publication in Journal of Lightwave Technology, vol. 13, No. 7, Jul. 1995, titled "Application of a Fiber Fourier Transform Spectrometer to the Detection of Wavelength–Encoded Signals from Bragg Grating Sensors", Authors: Davis et al., pp. 1289–1295.

Publication in Journal of Lightwave Technology, vol. 12, No. 4, Apr. 1994, titled "Fiber Laser Source/Analyzer for Bragg Grating Sensor Array Interrogation", Authors: Ball et al., pp. 700–703.

Publication in SPIE vol. 2574, Aug. 1995, titled "Fiber Optic Grating Technology", Author: William W. Morey, 3M Company, pp. 22–31.

Publication in Optical Engineering, vol. 32, No. 11, Nov. 1993, titled "Fiber Bragg grating laser sensor", Author: Andreas Othonos, University of Toronto, The Ontario Laser and Lightwaver Research Centre, 60 Saint George Street, Suite 331, Toronto, Ontario M5S–1A7 Canada, pp. 2841–2846.

Publication (Special Report) in Lightwave, Feb. 1996, titled "Bragg grating technology augments dense WDM communications", Authors: Sanders et al.

Publication titled "Evaluation of Fiber Optic Bragg Grating Strain Sensor in High Strength Concrete Beams", Authors: M.H. Maher, A.M. Asee and E.G. Nawy, F. Ase, published in The American Society of Civil Engineering 'Applications of fiber optic sensors in engineering mechanics: a collection of state of the art papers in the applications of fiber optic technologies to civil structures', published Jan. 1993, pp. 120–133.

PASSIVE OPTICAL WAVELENGTH ANALYZER WITH A PASSIVE NONUNIFORM OPTICAL GRATING

BACKGROUND OF THE INVENTION

1. Technical Field

The present invention generally relates to the analysis of light signal wavelength. More particularly, the present invention relates to the wavelength analysis of light signals using a non uniform optical grating and a photodiode array.

2. Background Information

Fiber-optic sensor development first began in the mid-1970's, and since then has been rapidly growing. Fiber-optic sensors possess several advantages over conventional sensors. The advantages include a dielectric construction allowing the sensor to be used in electrically noisy environments. Other advantages include small size, light weight, a flexible construction allowing the sensors to be configured into any shape or be embedded into structural components, compatibility with optical data lengths, and no active voltage. In recent years, fiber-optic sensor technology has matured to the state where these sensors are commercially available. Numerous fiber-optic sensing techniques based on intensity, phase or frequency (or wavelength) modulation have been reported for a variety of applications including strain measurements.

Most intensity-modulated sensors are simple to construct, and low cost. The major drawback of such sensors is the light intensity loss due to couplers, micro-bending of the fiber and other attenuation factors along the length of the optical fiber. Such effects directly impact the measured signal accuracy and reliability. On the other hand, phase-modulated sensors (or interferometric sensors) have shown high sensitivity and larger bandwidth, and are not affected by light-intensity fluctuations. However, such sensors are useful for measuring relative strain and not absolute values. This requires the monitoring system to be connected all the time or recalibration prior to making measurements.

Bragg gratings and white-light interferometers are to two sensors that can make absolute measurements, while being insensitive to light-intensity loss factors. The white-light interferometric sensors are suited for distributed sensing, since it is very difficult to place several such sensors along a single optical fiber. The key advantage of fiber-optic Bragg grating sensors is that they can be multiplexed serially, thus allowing several sensors to be placed on a single strand of optical fiber. Bragg grating sensors are the best choice for distributed sensing at the present time. However, the weakness is that distributed sensing with Bragg grating sensors requires very high resolution (on the order of 0.01 nm) spectrum analyzers for signal demodulation. It has been suggested that a second tunable Bragg grating at the receiver end be used to filter the signal reflected off the sensor grating, or use a tunable fiber-optic Fabry-Perot filter to demodulate the signal. However, these techniques are active, require sophisticated electronics to demodulate the signal, and are very expensive to implement.

Thus, a need exists for a cheaper, simpler and accurate light signal demodulation system, and in particular, for use with Bragg gratings.

SUMMARY OF THE INVENTION

Briefly, the present invention satisfies the need for an improved demodulation system by providing a nonuniform optical grating, resulting in passive demodulation.

In accordance with the above, it is an object of the present invention to provide improved light signal analysis.

It is a further object of the present invention to provide improved light signal analysis while refraining from the use of active demodulation.

The present invention provides, in a first aspect, apparatus for analyzing a light signal, comprising a passive nonuniform optical grating, and means for sensing a light intensity distribution of the light signal after passing through the passive nonuniform optical grating.

The present invention provides, in a second aspect, apparatus for determining a measurable parameter experienced by a light sensor grating. The apparatus contains a passive nonuniform optical grating for receiving a light signal reflected by the light sensor grating, a photodiode array in close proximity to the passive nonuniform optical grating for sensing a light intensity distribution of the reflected light signal, and means for detecting a peak intensity of the reflected light signal at the photodiode array and correlating the location of peak intensity to the measurable parameter experienced by the light sensor grating.

The present invention further provides, in a third aspect, a method for analyzing a light signal, comprising diffracting the light signal with a passive nonuniform optical grating to produce a spectrum, and determining a peak light intensity in the spectrum. The method may further comprise a step of correlating the peak light intensity to a measurable parameter.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
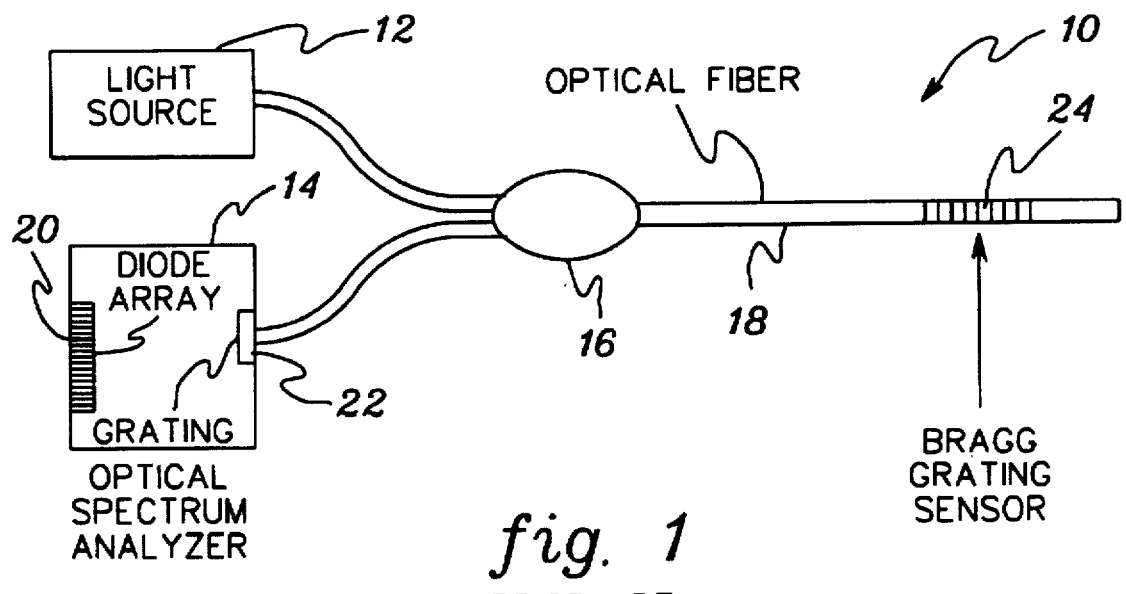
FIG. 1 depicts a conventional fiber-optic Bragg grating light sensor system.

FIG. 1 depicts a conventional fiber-optic Bragg grating light sensor system 10. System 10 comprises a light a source 12, optical spectrum analyzer 14, optical coupler 16, and single-mode optical fiber 18. Optical spectrum analyzer 14 comprises linear photodiode array 20 and uniform optical grating 22. Optical fiber 18 includes a Bragg grating sensor 24 therein.

The operation of system 10 will now be described in detail. Light from a broad-band light source 12 is channeled by an optical coupler 16 into single-mode optical fiber 18. As the light reaches Bragg grating sensor 24, a component of the light beam is reflected back toward optical spectrum analyzer 14. As one skilled in the art will know, the wavelength of the reflective light component is equal to twice the distance between the line spacings of the Bragg grating sensor etched on the interior of the core of optical fiber 18.

As one skilled in the art will know, an optical-fiber can be thought of two concentric cylinders, the inner cylinder being the "core" and the outer cylinder being the "cladding". An ultraviolet laser can then be used to create an interference pattern (strips so closely spaced that the naked eye cannot resolve them) on the inner wall of the core. In general, Bragg gratings are premised on the principle that a broad-band light impinging on a periodic grating will produce a reflection having a wavelength equal to half the distance between the Bragg grating spacings.

In general, an optical grating is a series of closely spaced alternating light blocking and light transmitting areas, with the distance between the light blocking areas matching the wavelength of light reflected thereby. Other wavelengths will be passed by the grating. The reflected light component enters optical spectrum analyzer 14, which demodulates the spectral component (i.e., reflects light of a wavelength equal to twice the spacing of uniform optical grating 22). The light that is passed through optical grating 22 impinges on linear photodiode array 20, causing individual photodiodes within array 20 to output a voltage indicative of the light intensity sensed thereby.

As used herein, the term "light" refers to any form of electromagnetic radiation. For example, the term "light" includes, without limitation, ultraviolet light, visible light and infrared light.

Figure 2A:
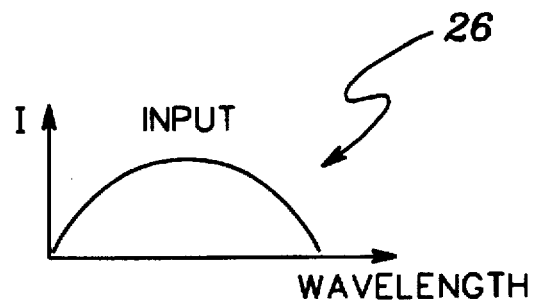
FIG. 2A is a graph of wavelength versus light intensity for the light entering the fiber-optic of FIG. 1.

FIG. 2A is a graph 26 of wavelength versus light intensity for the light signal entering optical fiber 18 from light source 12.

Figure 2B:
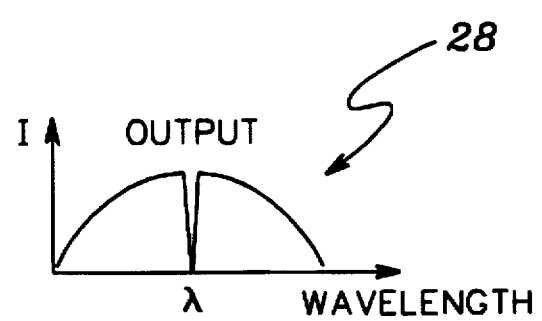
FIG. 2B is a graph of wavelength versus light intensity for a reflected light signal from the fiber-optic of FIG. 1.

FIG. 2B is a graph 28 of wavelength versus light intensity at optical spectrum analyzer 14. Graph 28 is similar to graph 26, except that a dip or negative intensity peak occurs at wavelength λ. This is the wavelength reflected by grating 22, which relates to the grating spacing of sensor 24. The grating spacing can be altered by applying a strain to sensor 24. Thus, using the difference between an expected wavelength at the optical spectrum analyzer and the actual wavelength, one can determine the strain on Bragg grating sensor 24 based on the equation: strain =k×λ, where k is a constant and λ is a wavelength.

Similarly, several sensors of different spacings can be placed along optical fiber 18, so that the spectrum analyzer can be used to relate the reflected spectral component to the appropriate Bragg grating sensor, such that the location of the strain can also be know. However, it will be recognized that uniform optical grating 22 and optical spectrum analyzer 14 could only detect a single wavelength. Therefore, implementations of this theory have focused on active demodulation techniques, for example, grating 22 has been sinusoidally stretched on piezoelectric material. At some point, the spacing of grating 22 will match that of the sensor being stressed by some measurable parameter. However, active demodulation techniques are not preferred, since the physical stressor(s) experienced by grating 22 degrades the accuracy thereof, and requires eventual replacement.

As one skilled in the art will know, a conventional optical spectrum analyzer includes a grating and photodiode array, however, the grating spacing is uniform and disperses the incoming visible light into different colors, like a prism. The conventional analyzer determines the peak light intensity for the different colors, indicating the wavelength of the incoming undispersed white light. The resolution of these devices is inferior, making a conventional optical spectrum analyzer impractical for the purpose of determining stressors on the light sensors. Since the grating disperses the light, multiple photodiode arrays would need to be placed very far (about 10 meters) from the grating in order to obtain resolutions on the order of 0.01 nm. However, that distance would also result in a drop in perceived intensity, causing other resolution problems.

Figure 3:
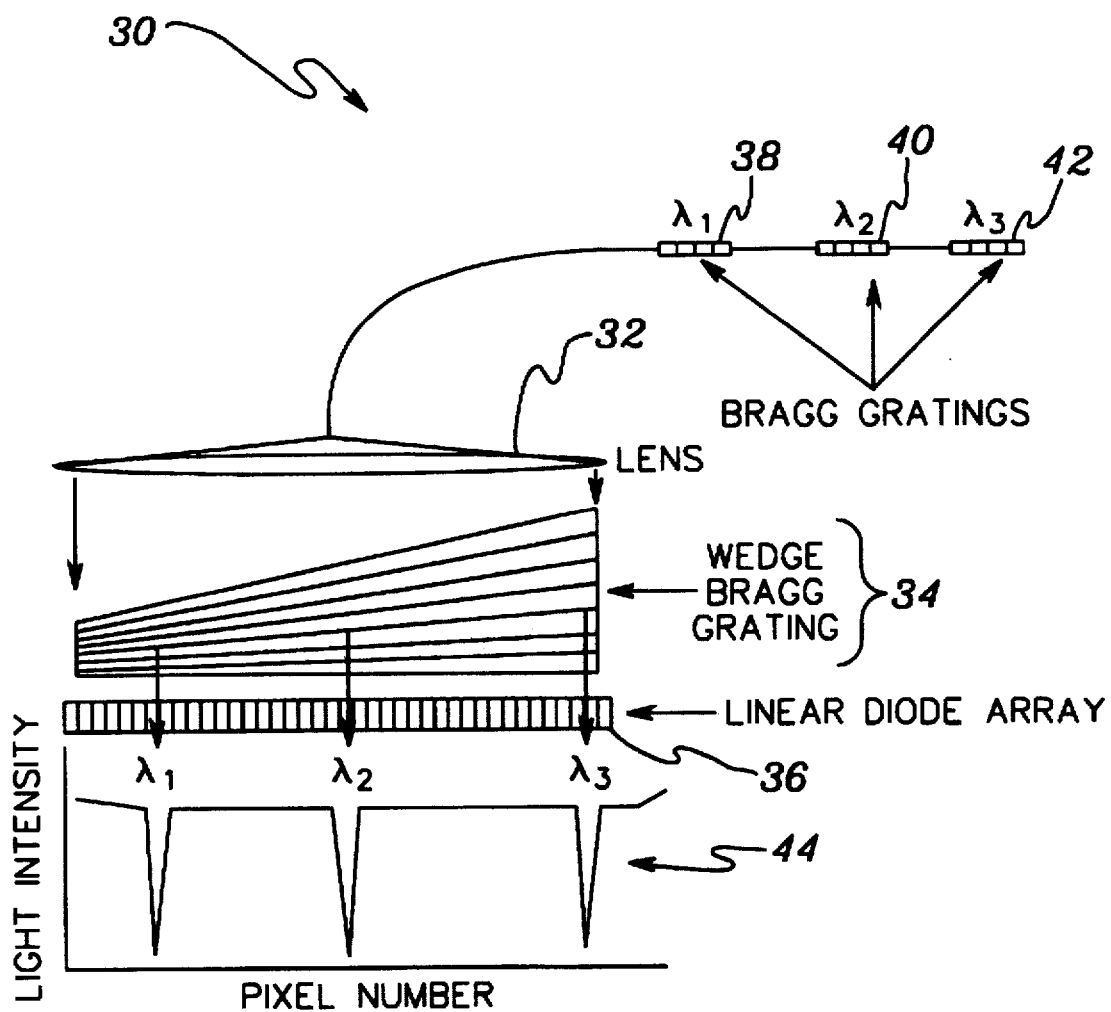
FIG. 3 depicts a demodulation system according to the present invention, comprising a wedge Bragg grating.

The present invention provides passive demodulation with a nonuniform grating at the back end. FIG. 3 depicts a demodulation system 30 according the present invention. System 30 comprises lens 32, wedge Bragg grating 34, and linear photodiode array 36. As used in the context of the present invention, the term "photodiode" includes any electronic means for sensing light intensity, including, for example, light-sensitive diodes and charge coupled devices. As shown in FIG. 3, the grating spacing in wedge Bragg grating 34 varies along the length thereof. Light reflected from fiber-optic uniform Bragg grating sensors 38, 40 and 42 is minimally transmitted (i.e., mostly reflected) through wedge Bragg grating 34 at a position where the sensor and receiver grating spacings match. Lens 32 expands the reflected light signal to cover the surface area of grating 34. Linear photodiode array 36 placed just behind wedge Bragg grating 34 detects the transmitted light, and a simple peak detection algorithm can be used to determine the location of the peak intensity of the reflected length signal. As used herein, the term "peak" refers to the maximum or minimum light intensity. Graph 38 plots pixel number of the linear photodiode array against light intensity, showing peaks (here, dips in graph 38) relating to sensor gratings 38, 40 and 42.

A standard calibration filter can be used to establish a relationship between wavelength and pixel number. The known wavelength (x) for the filter is assigned to the pixel number (n) corresponding to the peak intensity. Given the resolution (y), the wavelength for pixel number n−1 will be x−y, and so on.

A strain or other measurable parameter applied to the sensor gratings alters the grating spacing, resulting in a shift in the position of the peak light intensity transmitted through wedge Bragg grating 34. Thus, the position of the peak intensity relative to the linear photodiode array will be indicative of a particular stressor placed on the relevant Bragg grating sensor. For example, assume sensor 40 has a spacing in the unstrained state of 1550 nm and the total range is 4 nm. Thus, wedge Bragg grating 34 will be constructed with a spacing at the lowest end of 1548 nm and 1552 nm at the highest end. The lowest point and the highest point will correspond to the zero pixel and the maximum pixel (e.g., 512, 1024, 2048, etc.) on photodiode array 36. If array 36 had 2048 pixels, one could obtain a resolution of approximately 0.0002 nm with an eighth of a pixel interpolation (i.e., 4 nm/(8 nm×2048)).

The wedge Bragg grating can be constructed in the same manner as the fiber-optic Bragg grating sensors. For example, the gratings could be holographically etched. The master of the fringe pattern will have varying spacings on the grating. Alternatively, one could use an equally spaced master, but strain the wedge during etching such that when unstrained, the spacing will gradually vary along its length.

Typically, for Bragg grating sensors, the resolution requirement is on the order of 0.01 nm or better. With conventional optical spectrum analyzers, it is difficult to obtain resolutions better than 0.1 nm. The reason for this is that the uniform grating of the optical spectrum analyzer disperses the incoming light signal into the components thereof. The dispersion results in a system with the photodiode array placed about 10 meters or so away from the uniform grating, in order to obtain a resolution of 0.01 nm.

In the present invention, this problem is solved with, e.g., a lens that expands the reflected bit signal to match the width of the grating. In this way, the reflected signal transmits maximally or minimally through the nonuniform grating at a location where the spacing is half the wavelength of the light signal. This allows the photodetector array to be placed just behind the grating.

Figure 4:
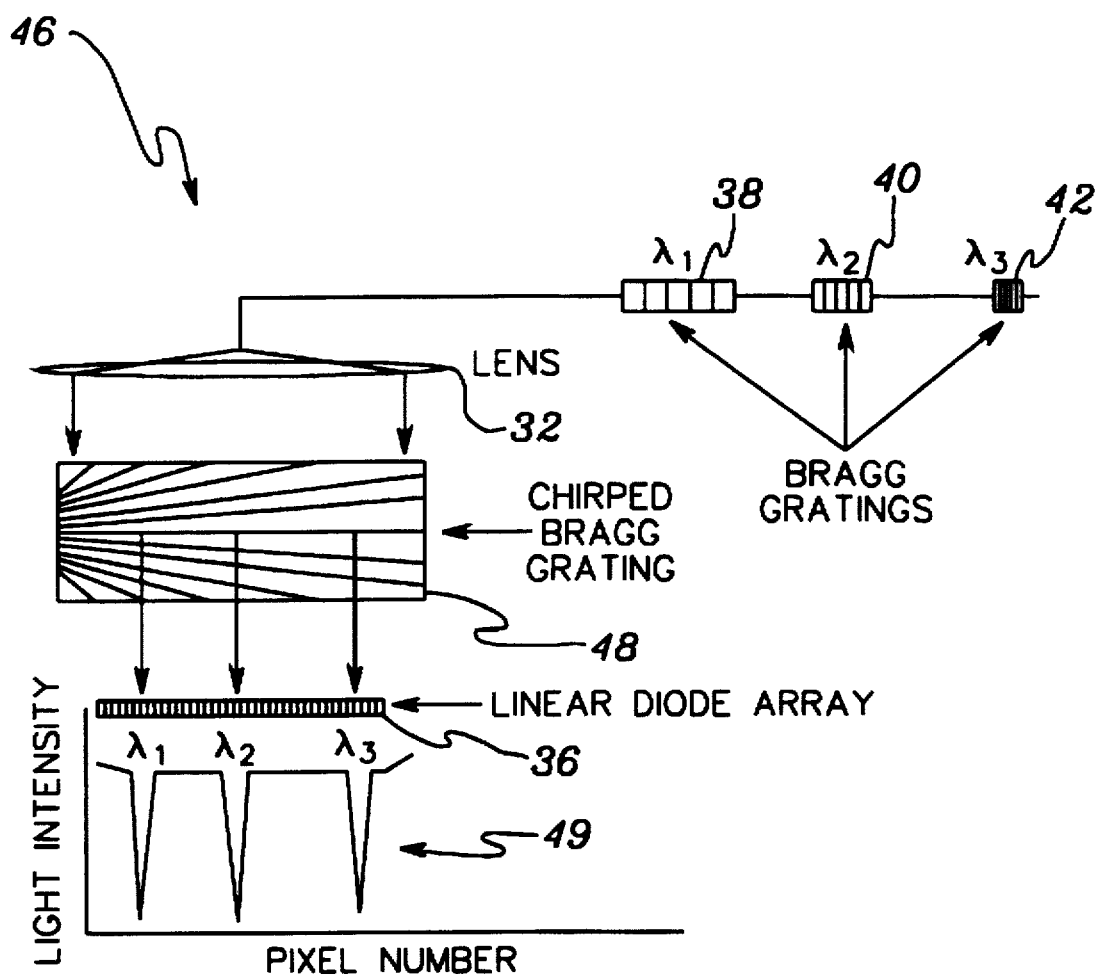
FIG. 4 depicts another demodulation system according the present invention, comprising a chirped Bragg grating.

FIG. 4 depicts another modulation system 46 according the present invention. System 46 includes sensors 38, 40 and 42, lens 32 and linear photodiode array 36 of FIG. 3. Wedge Bragg grating 34 has been replaced by chirped Bragg grating 48. Chirped Bragg grating 48, like wedge Bragg grating 34, has varying grating spacing along its length. However, the varying spacing is obtained by lines resembling radiation emanating from a pinpoint source. Chirped Bragg grating 48 comprises grating spacings on a rectangular silica substrate.

Referring again to FIG. 4, assume that a 12,000 microstrain is placed on sensor 40. It has been shown that such a strain results in a wavelength shift of about 7 nm. To obtain a one microstrain resolution, the spectrum analyzer would need to resolve 7/12000 nm, which is approximately 0.0006 nm and is not practical with current commercially available spectrum analyzers. In the system 46 of FIG. 4, the spacing for chirped Bragg grating 48 at the low end (i.e., on the left side) would have to be roughly 828/2 nm and 835/2 nm at the high end (i.e., on the right side). Again, using a linear photodiode array of 2048 pixels and an eighth of a pixel interpolation, a resolution of approximately 0.0000625 nm over the 7 nm range is possible. This results in a resolution of better than 1 microstrain. As one skilled in the art will know, the unit of "microstrain" relates to the stretching or contraction of a material by 1 microinch. In general, strain is the change in length of a material over the original length of the material prior to encountering a stressor.

Figure 5:
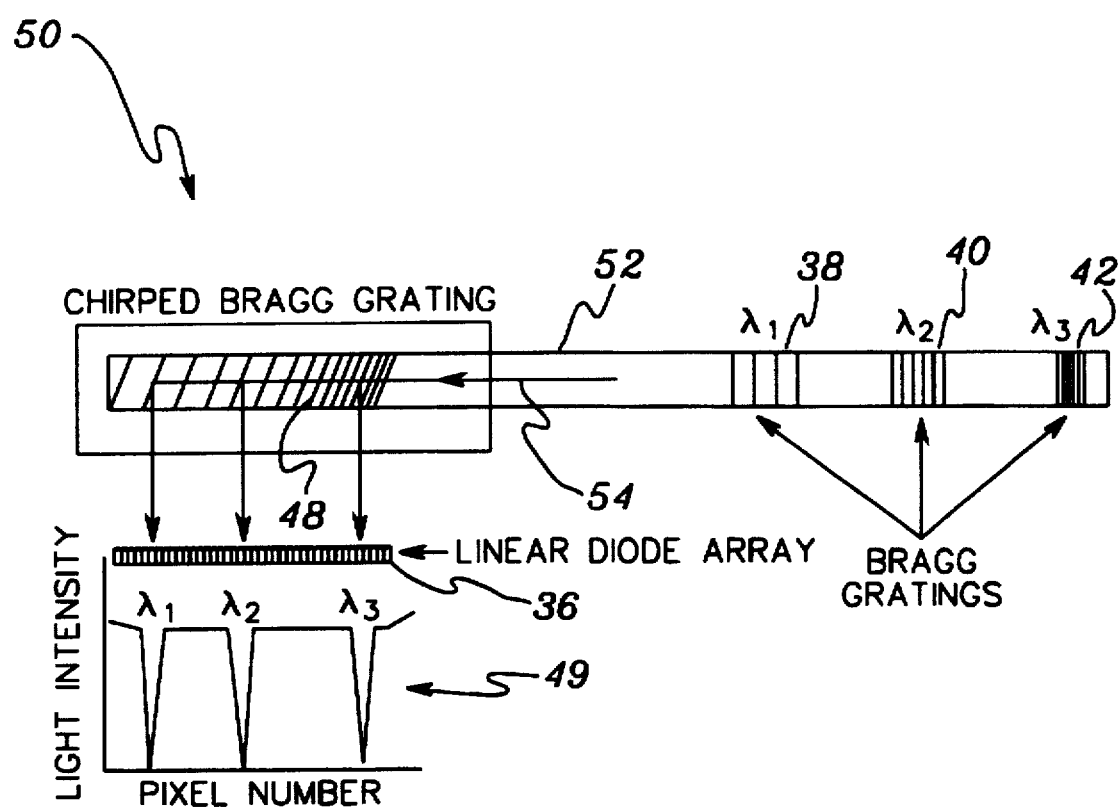
FIG. 5 depicts a demodulation system according to the present invention similar to that in of FIG. 4, except that the chirped Bragg grating is part of the fiber-optic.

FIG. 5 depicts a demodulation system 50 similar to that of FIG. 4, except that chirped Bragg grating 48 has been etched on the core of a fiber-optic 52, also encompassing uniform Bragg grating sensors 38, 40 and 42. If linear photodiode array 36 is placed adjacent fiber-optic 52, chirped Bragg grating 48 will disperse reflected light signal 54 at a 90° angle, as shown.

Figure 6:
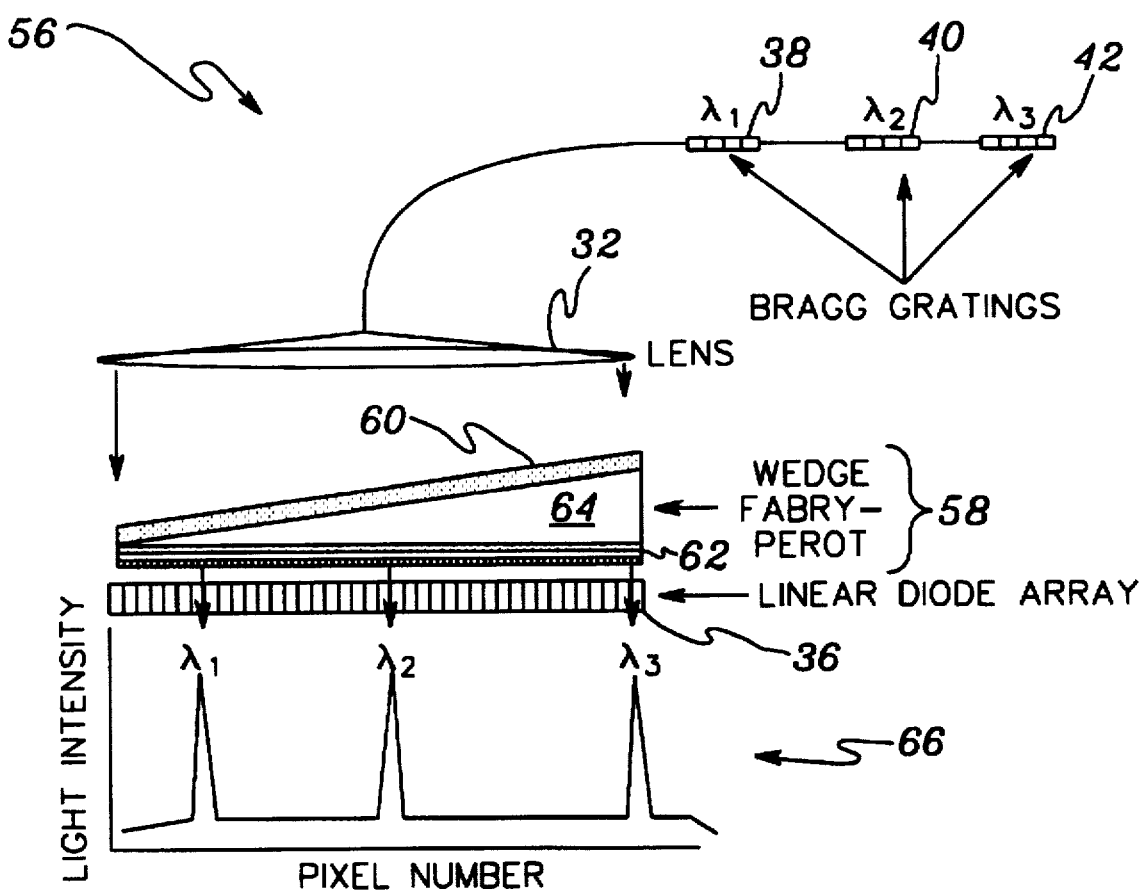
FIG. 6 depicts still another demodulation system according to the present invention, comprising a wedge Fabry-Perot grating.

FIG. 6 depicts yet another embodiment of the present invention. Shown in FIG. 6 is demodulation system 56, including sensors 38, 40 and 42, lens 32 and linear photodiode array 36 from FIG. 3. However, system 56 replaces wedge Bragg grating 34 with a wedge Fabry-Perot detector (or filter) 58. As one skilled in the art will understand, wedge Fabry-Perot detector 58 is based on the principle that two facing mirrors 60 and 62 will reflect portions of a broadband light based on the gap 64 and angle between the mirrors. As with the demodulation system of FIG. 3, demodulation system 56 produces peak light intensities as shown in graph 66. The light reflected from a given Bragg grating sensor is maximally transmitted through wedge Fabry-Perot detector 58 at positions where the optical path length is equal to half the wavelength of the reflected light. A strain or other measurable parameter applied to one or more of the Bragg sensors changes the grating spacing thereof, resulting in a shift in the wavelength of the reflected light signal. A shift in the wavelength results in a shifting of the position at which the transmitted signal intensity is a maximum. Linear photodiode array 36 detects the light transmitted through wedge Fabry-Perot detector 58, and a simple peak detection algorithm can determine the location of the peak transmitted signals (shown visually in graph 66). By altering the angle of mirror 60 with respect to mirror 62, the bandwidth and resolution of system 56 can be controlled. Altering the wedge height alters the detectable wavelength region. For example, if the wedge height doubles, the detectable wavelength range also doubles, however, the resolution is halved, since the number of pixels on the array did not change.

The operation of demodulation system 56 will now be described by way of example. Assume the wavelength corresponding to the grating spacings and sensor 40 when unstrained is 1550 nm, and the total range is 4 nm. Wedge Fabry-Perot grating 58 would then be constructed with a spacing at the lowest end corresponding to 1548 nm and a spacing at the highest end corresponding to 1552 nm. The difference between the maximum and minimum distances is the range referred to above (in this case, 4 nm). The lowest point and the highest point will correspond to the zero pixel and maximum pixel on the photodiode array. If we again consider a photodiode array of 2048 pixels, one can obtain a resolution of approximately 0.0002 nm with an eighth of a pixel interpolation.

Figure 7:
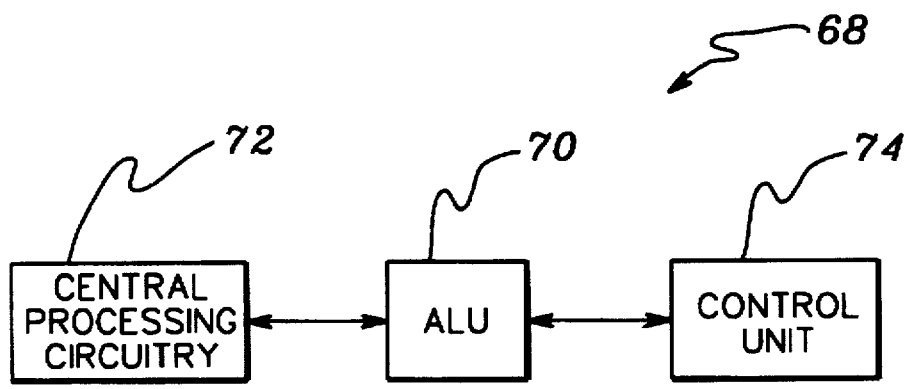
FIG. 7 is a block diagram of a microprocessor useful with the present invention.

FIG. 7 is a block diagram of a microprocessor 68 useful with the present invention. Microprocessor 68 comprises arithmetic and logic unit 70, central processing circuitry 72, and control unit 74. Arithmetic and logic unit 70 performs the arithmetic and logic operations. Central processing circuitry 72 includes memory for holding a program. Control unit 74 takes program instructions from central processing circuitry 72, interprets them, and starts the indicated operation. Microprocessor 68 could be programmed to detect a peak light intensity of the reflected light signal, and correlate the location of the peak on the photodiode array to the measurable parameter experienced by the sensor.

One can conceive of many real-world applications for the present invention. For example, a single optical-fiber with several Bragg grating sensors of different spacings can be placed in a composite material comprised of fibers for use in an airplane to sense strain on the airplane. As another example, such an optical-fiber could be attached to a bridge, and an identical one kept outside the bridge. The attached fiber-optic will be affected by mechanical stresses and temperature, while the one not attached will only be affected by the surrounding temperature. By subtracting the results of the outside fiber-optic from the attached fiber-optic, one could determine the affects of mechanical stresses on the bridge.

Another beneficiary of the Bragg grating technology is the optical communication industry. Such gratings can be used as filters for signal multiplexing (i.e., wavelength division multiplexing). The present invention could be used to construct a low-cost reader unit, which would be extremely useful in that type of work. Such a unit could be used to read the center wavelength of Bragg gratings, analogous to a multimeter used for measuring the resistance of a resistor.

Although the present invention has been presented in the context of Bragg grating sensors in an optical-fiber, one skilled in the art will appreciate that the present invention is applicable to other types of sensors. For example, the present invention is applicable to integrated optic sensors, which are part of an integrated circuit. Specifically, channels formed in a semiconductor substrate are used to guide light signals, with the electronics for analyzing the light signals being placed on the same chip, as well as the light source. Thus, the chip itself could be attached to or imbedded in some structure for determining a measurable parameter, for example, strain, pressure (chip attached to a diaphragm) or temperature (sense environment). As another example, light signals could be sent through the air, with the nonuniform grating taking the form of a piece of glass.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

I claim:

1. Apparatus for analyzing a light signal, comprising:
   one or more remote sensors;
   a passive nonuniform optical grating for receiving a light signal from the one or more remote sensors; and
   means for sensing a light intensity distribution of the light signal after passing through the passive nonuniform optical grating.

2. The apparatus of claim 1 wherein the passive nonuniform optical grating comprises a wedge Bragg grating.

3. The apparatus of claim 1 wherein the passive nonuniform optical grating comprises a chirped Bragg grating.

4. The apparatus of claim 1 wherein the sensor means comprises a linear photodiode array.

5. The apparatus of claim 4 further comprising a processor for determining a location on the linear photodiode array sensing a peak intensity.

6. Apparatus for determining a measurable parameter experienced by a remote light sensor grating, comprising:
   a passive nonuniform optical grating for receiving a light signal reflected by the remote light sensor grating;
   a photodiode array in close proximity to the passive nonuniform optical grating for sensing a light intensity distribution of the reflected light signal; and
   means for detecting a peak intensity of the reflected light signal at the photodiode array and correlating the location of the peak intensity to the measurable parameter experienced by the remote light sensor grating.

7. The apparatus of claim 6, wherein the remote light sensor grating comprises a plurality of remote light sensor gratings, each remote light sensor grating having a different center wavelength, and wherein the detecting means detects a peak intensity of the reflected light signal for each remote light sensor grating and correlates each peak intensity to the measurable parameter.

8. The apparatus of claim 6 wherein the passive nonuniform optical grating comprises a wedge Bragg grating.

9. The apparatus of claim 6 wherein the passive nonuniform optical grating comprises a chirped Bragg grating.

10. The apparatus of claim 6, wherein the remote light sensor grating comprises a uniform Bragg grating and is part of a fiber optic, the apparatus further comprising a lens for expanding the reflected light signal prior to impinging on the passive nonuniform optical grating.

11. The apparatus of claim 6 wherein the photodiode array comprises a linear photodiode array.

12. The apparatus of claim 6 wherein the detecting and correlating means comprises a processor.

13. The apparatus of claim 6 wherein the measurable parameter comprises strain.

14. The apparatus of claim 6 wherein the measurable parameter comprises temperature.

15. The apparatus of claim 6 wherein the measurable parameter comprises pressure.

16. Apparatus for analyzing a light signal, comprising:
    one or more remote sensors;
    a wedge Fabry-Perot detector for receiving a light signal from the one or more remote sensors; and
    means for sensing a light intensity distribution of the light signal after passing through the wedge Fabry-Perot detector.

17. Apparatus for determining a measurable parameter experienced by a remote light sensor grating, comprising:
    a wedge Fabry-Perot detector for receiving a light signal reflected by the remote light sensor grating;
    a photodiode array in close proximity to the wedge Fabry-Perot detector for sensing a light intensity distribution of the reflected light signal; and
    means for detecting a peak intensity of the reflected light signal at the photodiode array and correlating the location of the peak intensity to the measurable parameter experienced by the remote light sensor grating.

18. A method for analyzing a light signal, comprising steps of:
    receiving a light signal from one or more remote sensors;
    diffracting the light signal with a passive nonuniform optical grating to produce a spectrum; and
    determining a peak light intensity in the spectrum.

19. The method of claim 18 further comprising a step of correlating the peak light intensity to a measurable parameter.

20. The method of claim 18, wherein the step of determining comprises steps of:
    sensing a light intensity distribution of the spectrum; and
    determining the peak light intensity from the light intensity distribution.

21. The method of claim 20, wherein the step of sensing is accomplished with a linear photodiode array, the method further comprising a step of correlating the peak light intensity to a measurable parameter.

* * * * *